US012003938B2

(12) United States Patent
Liu et al.

(10) Patent No.: US 12,003,938 B2
(45) Date of Patent: Jun. 4, 2024

(54) SPEAKER

(71) Applicant: AAC Microtech (Changzhou) Co., Ltd., Changzhou (CN)

(72) Inventors: Kejia Liu, Shenzhen (CN); Yuheng Jiang, Shenzhen (CN); Weimin Chen, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 168 days.

(21) Appl. No.: 17/880,703

(22) Filed: Aug. 4, 2022

(65) Prior Publication Data

US 2023/0199396 A1 Jun. 22, 2023

(30) Foreign Application Priority Data

Dec. 16, 2021 (CN) ......................... 202123176831.9

(51) Int. Cl.
*H04R 9/02* (2006.01)
*H04R 7/12* (2006.01)

(52) U.S. Cl.
CPC ............. *H04R 9/025* (2013.01); *H04R 7/127* (2013.01)

(58) Field of Classification Search
CPC .......... H04R 9/025; H04R 7/127; H04R 1/06; H04R 1/24; H04R 7/122; H04R 9/046; H04R 9/06
See application file for complete search history.

(56) References Cited

U.S. PATENT DOCUMENTS

2020/0208621 A1* 7/2020 Liu ......................... H02M 7/48

* cited by examiner

*Primary Examiner* — Tuan D Nguyen
(74) *Attorney, Agent, or Firm* — W&G Law Group

(57) ABSTRACT

A speaker includes a frame, a vibration system, and a magnetic circuit system. The vibration system and the magnetic circuit system are respectively disposed on the frame. The vibration system includes a sound film and a voice coil. The voice coil drives the sound film to vibrate and sound. The magnetic circuit system includes a lower clamping plate, a first magnetic steel, and a second magnetic steel. The first magnetic steel is disposed on the lower clamping plate. The annular second magnetic steel is disposed on the lower clamping plate and surrounds the first magnetic steel. The first magnetic steel and the second magnetic steel are disposed at intervals to form a first gap. The speaker has better performance.

8 Claims, 4 Drawing Sheets

SPEAKER

TECHNICAL FIELD

The present disclosure relates to the field of electroacoustic conversion, and in particular to a speaker for portable electronic products.

BACKGROUND

A speaker is configured as a sound playing device for portable electronic products, and performance of the speaker further put forward higher requirements since sound playing requirements of people are increased. How to have a greater frequency response output under a same voltage becomes a focus of general research in industry.

At present, one important factor to limit the speaker frequency response output is BL (magnetic force) of the speaker. In general, the higher the BL of the speaker, the larger a displacement of a sound film under the same voltage, and the higher sensitivity of the speaker.

Therefore, it is necessary to provide a new speaker to solve above technical problems.

SUMMARY

The present disclosure aims to provide a speaker having better performance to overcome above technical problems.

In order to achieve above aims, the present disclosure provides the speaker, including a frame, a vibration system, and a magnetic circuit system. The vibration system and the magnetic circuit system are respectively disposed on the frame. The vibration system includes a sound film and a voice coil, and the voice coil is configured to drive the sound film to vibrate and produce sound. The magnetic circuit system includes a lower clamping plate, a first magnetic steel, and a second magnetic steel. The first magnetic steel is disposed on the lower clamping plate. The second magnetic steel is annular, and the second magnetic steel is disposed on the lower clamping plate and surrounds the first magnetic steel. The first magnetic steel and the second magnetic steel are disposed at intervals to form a first gap. The voice coil includes a first voice coil and a second voice coil. The first voice coil is inserted into the first gap, and the second voice coil surrounds outer sides of the second magnetic steel.

As an improvement, a magnetic pole of one side, close to the lower clamping plate, of the first magnetic steel is opposite to a magnetic pole of one side, close to the lower clamping plate, of the second magnetic steel. Directions of currents passing through the first voice coil and the second voice coil are opposite.

As an improvement, the magnetic circuit system further includes third magnetic steels, and the third magnetic steels are disposed on the lower clamping plate and disposed on outer sides of the second magnetic steel. The third magnetic steels and the second magnetic steel are disposed at intervals to form second gaps. The second voice coil is inserted into the second gaps. A magnetic pole of one side, close to the lower clamping plate, of each of the third magnetic steel is opposite to the magnetic pole of the one side, close to the lower clamping plate, of the second magnetic steel.

As an improvement, the sound film includes a middle portion, a first folding ring, a connecting portion, a second folding ring, and a fixing portion. The first folding ring extends outwards from the middle portion, the connecting portion extends outwards from the first folding ring, the second folding ring extends outwards from the connecting portion, and the fixing portion extends outwards from the second folding ring. The fixing portion is fixed to the frame. The first voice coil is disposed inside the first folding ring. The second voice coil is disposed between the first folding ring and the second folding ring.

As an improvement, the sound film further includes a first dome and a second dome. The first dome is attached to the middle portion, and the second dome is attached to the connecting portion.

As an improvement, the vibration system further includes elastic supporting members. Each of the elastic supporting members is disposed on one side, close to the magnetic circuit system, of the sound film. The elastic supporting members are disposed at intervals with the sound film, and the second voice coil is fixed to the elastic supporting members.

As an improvement, each of the elastic supporting members includes a flexible circuit board and a vibration diaphragm. The flexible circuit board is fixed to the second voice coil. The vibration diaphragm is fixed to one side, distal from the sound film, of the flexible circuit board.

As an improvement, a fixing wall is disposed at a corner of the frame, and the fixing wall extends in a direction distal from the sound film. A mounting notch is defined at a corner of the lower clamping plate, and the mounting notch is matched with the fixing wall. The fixing wall is inserted into the mounting notch and clamps and fixes the lower clamping plate.

The present disclosure provides the speaker, and the voice coil in which configured to drive the sound film to vibrate and produce sound includes the first voice coil and the second voice coil, which improves the BL, provides a greater driving force, effectively improves sensitivity, and has better performance of the speaker.

BRIEF DESCRIPTION OF DRAWINGS

In order to more clearly illustrate technical solutions in embodiments of the present disclosure, drawings required in description of the embodiments are briefly described below. Obviously, the drawings in the following description are merely some embodiments of the present disclosure. For a person of ordinary skill in art, other drawings may be obtained according to the drawings without creative efforts.

DETAILED DESCRIPTION

Figure 1:
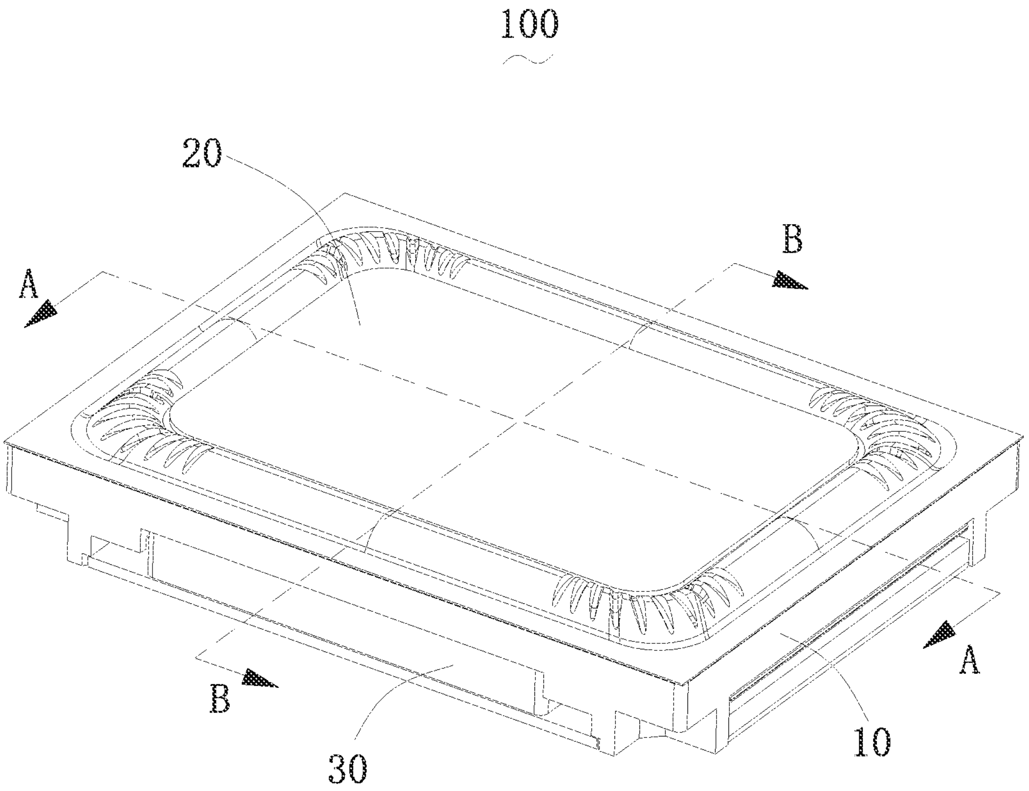
FIG. 1 is a three-dimensional schematic diagram of a speaker according to one embodiment of the present disclosure.
Figure 2:
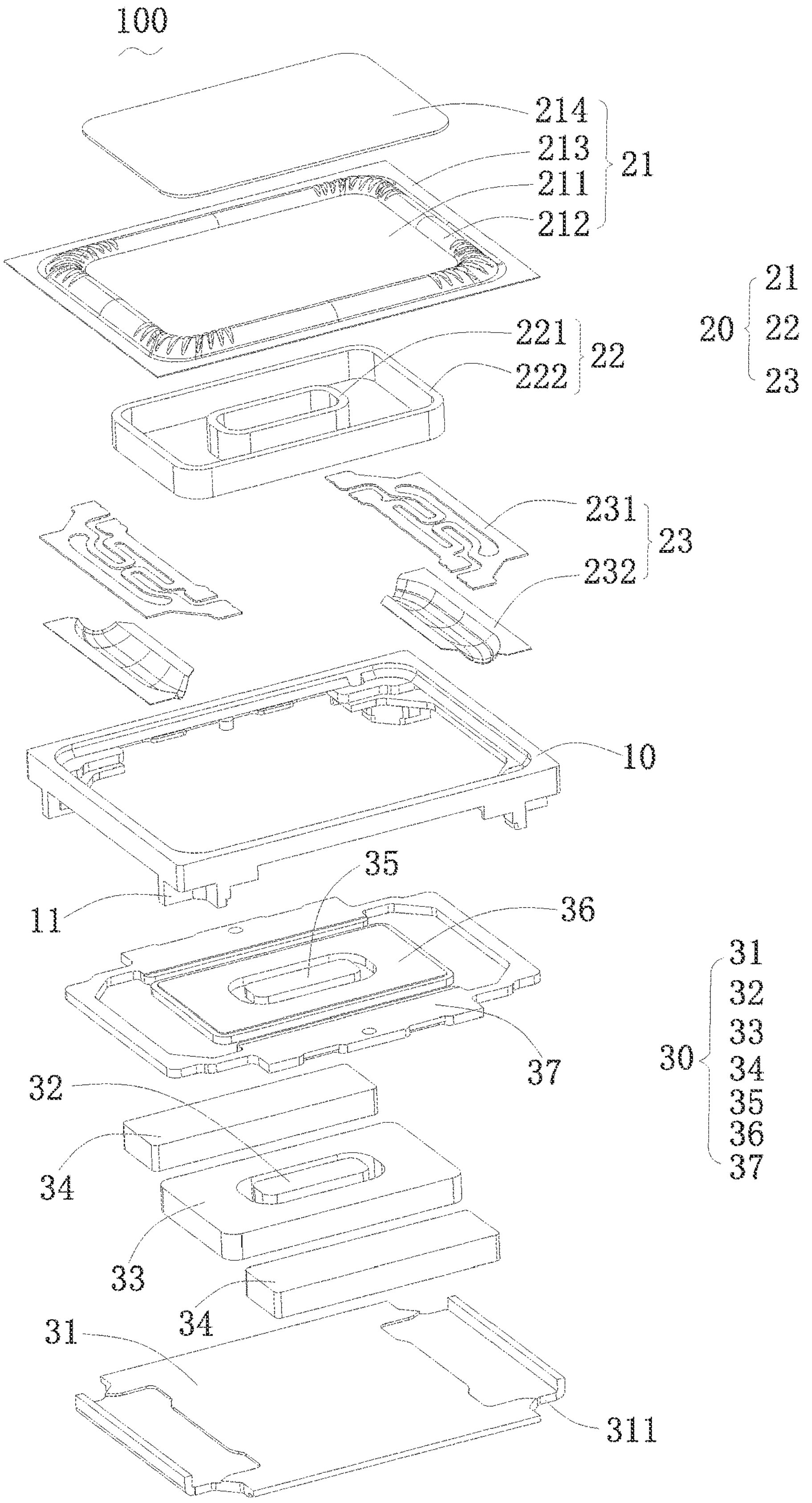
FIG. 2 is an exploded three-dimensional schematic diagram of the speaker shown in FIG. 1.
Figure 3:
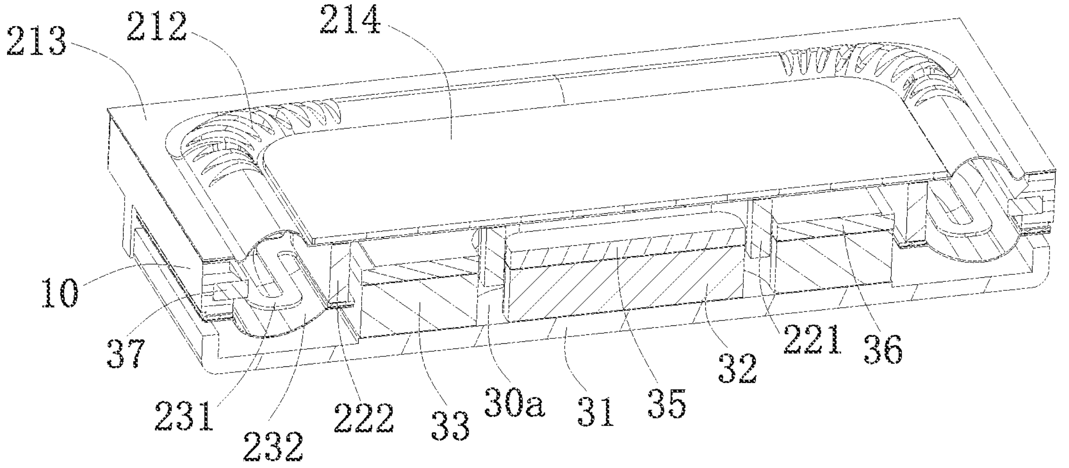
FIG. 3 is a cross-sectional schematic diagram taken along the line A-A shown in FIG. 1.
Figure 4:
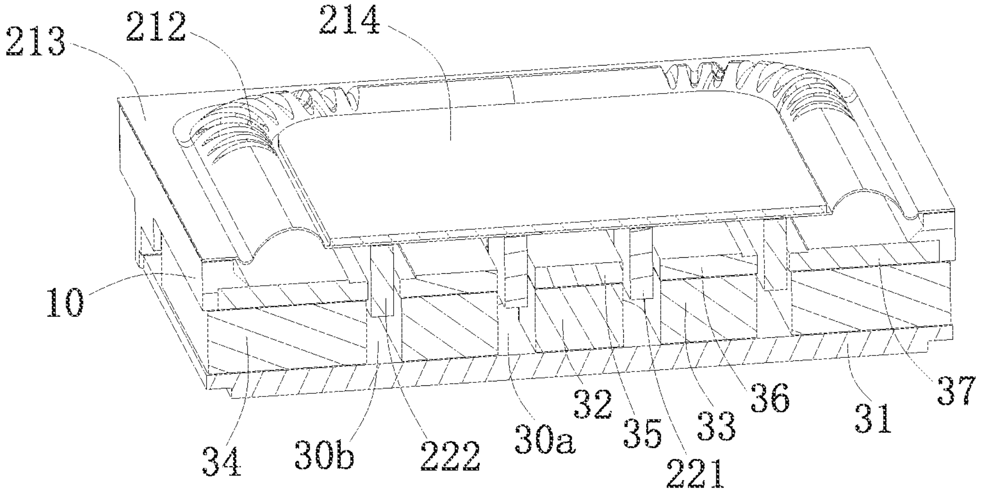
FIG. 4 is a cross-sectional schematic diagram taken along the line B-B shown in FIG. 1.

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Referring to FIGS. 1-4, the present disclosure provides a speaker 100 including a frame 10, a vibration system 20, and a magnetic circuit system 30. The vibration system 20 and the magnetic circuit system 30 are respectively disposed on the frame 10.

The vibration system 20 includes a sound film 21, a voice coil 22, and elastic supporting members 23. The voice coil 22 is configured to drive the sound film 21 to vibrate and produce sound. Each of the elastic supporting members 23 is disposed on one side, close to the magnetic circuit system 30, of the sound film 21. The elastic supporting members 23 are disposed at intervals with the sound film 21. The sound film 21 includes a middle portion 211, a folding ring 212, a fixing portion 213, and a dome 214. The folding ring 212 extends outwards from the middle portion 211. The fixing portion 213 extends outwards from the folding ring 212. The dome 214 is attached to an upper surface of the middle portion 211. The voice coil 22 includes a first voice coil 221 and a second voice coil 222 where the first voice coil 221 and the second voice soil 222 are fixed to a lower surface of the middle portion 211. A bottom of the second voice coil 222 is fixed to a first end of each of the elastic supporting members 23, and a second end of each of the elastic supporting members 23 is fixed to the frame 10. Each of the elastic supporting members 23 includes a flexible circuit board 231 and a vibration diaphragm 232. The flexible circuit board 231 is fixed to the second voice coil 222, and the vibration diaphragm 232 is fixed to one side, distal from the sound film 21, of the flexible circuit board 231. The first voice coil 221 and the second voice coil 222 are electrically connected to an external circuit through the flexible circuit board 231.

The magnetic circuit system 30 includes a lower clamping plate 31, a first magnetic steel 32, a second magnetic steel 33, third magnetic steels 34, a first pole core 35, a second pole core 36, and a third pole core 37. The first magnetic steel 32 is disposed on the lower clamping plate 31. The second magnetic steel 33 is annular, and the second magnetic steel 33 is disposed on the lower clamping plate 31 and surrounds the first magnetic steel 32. The third magnetic steels 34 are disposed on the lower clamping plate 31 and disposed on outer sides of the second magnetic steel 33. The first pole core 35 is attached to the first magnetic steel 32, the second pole core 36 is attached to the second magnetic steel 33, and the third pole core 37 is attached to the third magnetic steels 34. The third pole core 37 is annular and is fixedly connected to the frame 10. The first magnetic steel 32 and the second magnetic steel 33 are disposed at intervals to form a first gap 30*a*, and the third magnetic steels 34 and the second magnetic steel 33 are disposed at intervals to form second gaps 30*b*. The first voice coil 221 is inserted into the first gap 30*a*, and the second voice coil 222 is inserted into the second gaps 30*b*. A magnetic pole of one side, close to the lower clamping plate 31, of the first magnetic steel 32 is opposite to a magnetic pole of one side, close to the lower clamping plate 31, of the second magnetic steel 33. A magnetic pole of one side, close to the lower clamping plate 31, of each of the third magnetic steels 34 is opposite to the magnetic pole of the one side, close to the lower clamping plate 31, of the second magnetic steel 33. Directions of currents passing through the first voice coil 221 and the second voice coil 222 are opposite.

As an improvement, a fixing wall 11 is disposed at a corner of the frame 10, and the fixing wall 11 extends in a direction distal from the sound film 21. A mounting notch 311 is defined at a corner of the lower clamping plate 31, the mounting notch 311 is matched with the fixing wall 11, and the fixing wall 11 is inserted into the mounting notch 311 and clamps and fixes the lower clamping plate 31. Such a clamping and engaging manner better positions and fixes the lower clamping plate 31.

The present disclosure provides the speaker 100, and the voice coil in which configured to drive the sound film to vibrate and produce sound includes the first voice coil and the second voice coil, which improves the BL, provides a greater driving force, effectively improves sensitivity, and has better performance of the speaker.

The present disclosure further provides another speaker similar to structures of the speaker 100, differences between the two speakers are in a structure of the sound film. Differences of the structures of the sound films of the two speakers are described below in conjunction with FIGS. 5-6, remaining parts may refer to the structure of the speaker 100 described above, and details are not described herein again.

Figure 5:
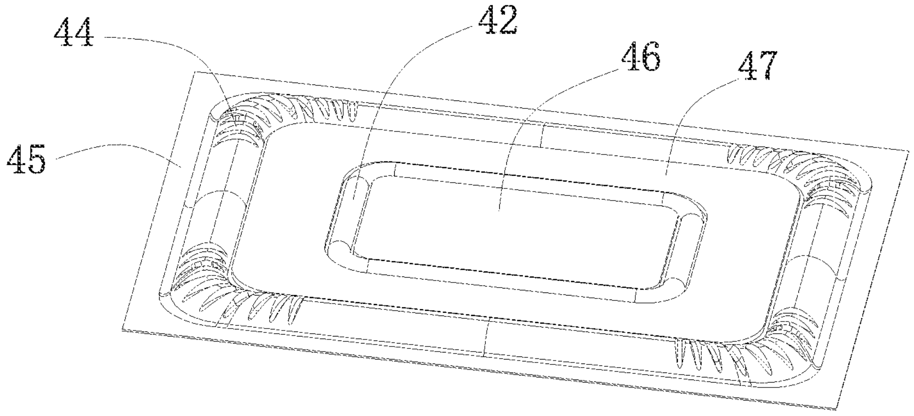
FIG. 5 is a combination schematic diagram of a sound film and a voice coil of another speaker according to one embodiment of the present disclosure.
Figure 6:
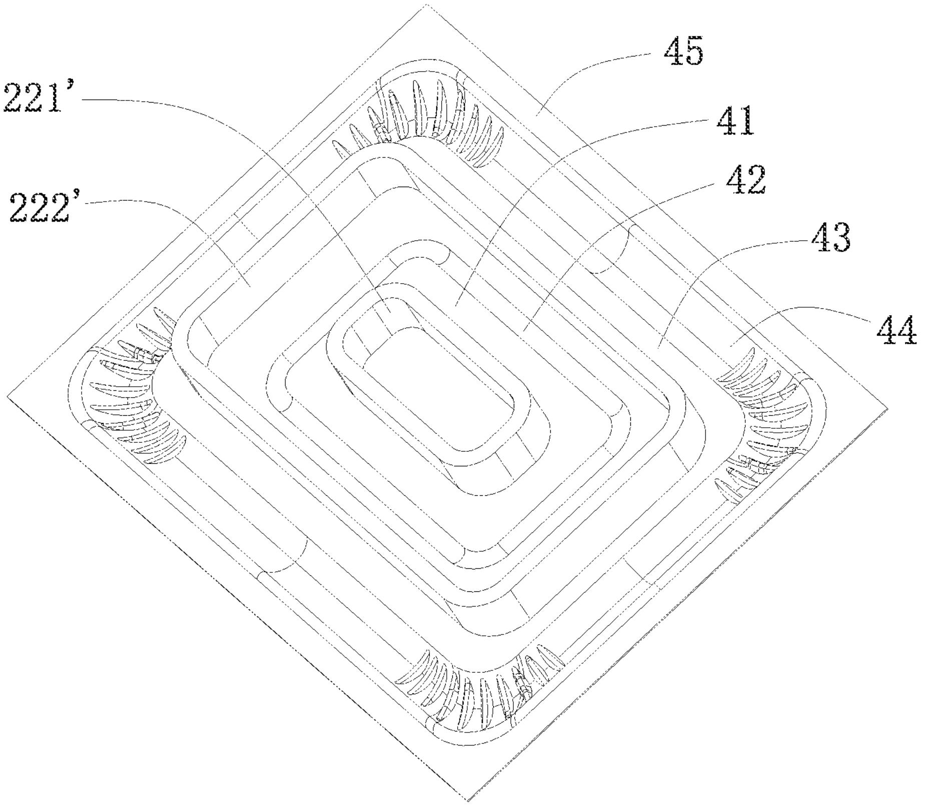
FIG. 6 is another combination schematic diagram of the sound film and the voice coil shown in FIG. 5.

As shown in FIGS. 5-6, a sound film of another speaker includes a middle portion 41, a first folding ring 42, a connecting portion 43, a second folding ring 44, a fixing portion 45, a first dome 46, and a second dome 47. The first folding ring 42 extends outwards from the middle portion 41, the connecting portion 43 extends outwards from the first folding ring 42, the second folding ring 44 extends outwards from the connecting portion 43, the fixing portion 45 extends outwards from the second folding ring 44, the first dome 46 is attached to an upper surface of the middle portion 41, and the second dome 47 is attached to an upper surface of the connecting portion 43. The first voice coil 221' is disposed inside the first folding ring 42 and is fixed to a lower surface of the middle portion 41. The second voice coil 222' is disposed between the first folding ring 42 and the second folding ring 44, and the second voice coil 222' is fixed to a lower surface of the connecting portion 43. The fixing portion 45 is further configured to be fixed to the frame, The present disclosure has advantages that two resonance systems are formed through disposing the first folding ring inside and the outer second folding ring outside, which adds a high-frequency resonance peak, additionally improves high-frequency frequency response, and has a wider bandwidth. In addition to being connected in series and in parallel, the two voice coils are further independently controlled. Performance of the speaker is better improved after the two voice coils are independently controlled and matched with frequency response characteristics of the speaker.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A speaker, comprising:

a frame;

a vibration system; and a magnetic circuit system;

wherein the vibration system and the magnetic circuit system are respectively disposed on the frame; the vibration system comprises a sound film and a voice coil, the voice coil is configured to drive the sound film to vibrate and produce sound; the magnetic circuit system comprises a lower clamping plate, a first magnetic steel, and a second magnetic steel; the first magnetic steel is disposed on the lower clamping plate, the second magnetic steel is annular, and the second magnetic steel is disposed on the lower clamping plate and surrounds the first magnetic steel; the first magnetic steel and the second magnetic steel are disposed at intervals to form a first gap, the voice coil comprises a first voice coil and a second voice coil, the first voice coil is inserted into the first gap, and the second voice coil surrounds outer sides of the second magnetic steel.

2. The speaker according to claim 1, wherein a magnetic pole of one side, close to the lower clamping plate, of the first magnetic steel is opposite to a magnetic pole of one side, close to the lower clamping plate, of the second magnetic steel; and directions of currents passing through the first voice coil and the second voice coil are opposite.

3. The speaker according to claim 2, wherein the magnetic circuit system further comprises third magnetic steels, the third magnetic steels are disposed on the lower clamping plate and disposed on outer sides of the second magnetic steel, the third magnetic steels and the second magnetic steel are disposed at intervals to form second gaps, the second voice coil is inserted into the second gaps; a magnetic pole of one side, close to the lower clamping plate, of each of the third magnetic steels is opposite to the magnetic pole of the one side, close to the lower clamping plate, of the second magnetic steel.

4. The speaker according to claim 1, wherein the sound film comprises a middle portion, a first folding ring, a connecting portion, a second folding ring, and a fixing portion; the first folding ring extends outwards from the middle portion, the connecting portion extends outwards from the first folding ring, the second folding ring extends outwards from the connecting portion, the fixing portion extends outwards from the second folding ring, the fixing portion is fixed to the frame, the first voice coil is disposed inside the first folding ring, and the second voice coil is disposed between the first folding ring and the second folding ring.

5. The speaker according to claim 4, wherein the sound film further comprises a first dome and a second dome, the first dome is attached to the middle portion, and the second dome is attached to the connecting portion.

6. The speaker according to claim 1, wherein the vibration system further comprises elastic supporting members, each of the elastic supporting members is disposed on one side, close to the magnetic circuit system, of the sound film; the elastic supporting members are disposed at intervals with the sound film, and the second voice coil is fixed to the elastic supporting members.

7. The speaker according to claim 6, wherein each of the elastic supporting members comprises a flexible circuit board and a vibration diaphragm, the flexible circuit board is fixed to the second voice coil; and the vibration diaphragm is fixed to one side, distal from the sound film, of the flexible circuit board.

8. The speaker according to claim 1, wherein a fixing wall is disposed at a corner of the frame, the fixing wall extends in a direction distal from the sound film, a mounting notch is defined at a corner of the lower clamping plate, and the mounting notch is matched with the fixing wall, and the fixing wall is inserted into the mounting notch and clamps and fixes the lower clamping plate.

* * * * *